(12) United States Patent
Chen et al.

(10) Patent No.: US 9,262,652 B2
(45) Date of Patent: Feb. 16, 2016

(54) CARD READING DEVICE WITH A PLURALITY OF PROTECTING MESH WIRES

(71) Applicant: UNIFORM INDUSTRIAL CORP., New Taipei (TW)

(72) Inventors: Yu-Tsung Chen, New Taipei (TW); Jui-Chiang Tsao, New Taipei (TW)

(73) Assignee: UNIFORM INDUSTRIAL CORP., New Taipei (TW)

( * ) Notice: Subject to any disclaimer, the term of this patent is extended or adjusted under 35 U.S.C. 154(b) by 0 days.

(21) Appl. No.: 14/533,616

(22) Filed: Nov. 5, 2014

(65) Prior Publication Data

US 2015/0242659 A1 Aug. 27, 2015

(30) Foreign Application Priority Data

Feb. 26, 2014 (TW) .............................. 103203356 U

(51) Int. Cl.
*G06K 7/01* (2006.01)
*G06F 21/87* (2013.01)

(52) U.S. Cl.
CPC . *G06K 7/01* (2013.01); *G06F 21/87* (2013.01)

(58) Field of Classification Search
CPC .................................. G06K 7/01; G06F 21/87
USPC ................... 235/435, 441, 436, 439
See application file for complete search history.

(56) References Cited

U.S. PATENT DOCUMENTS

| | | | | |
|---|---|---|---|---|
| 4,811,288 A * | 3/1989 | Kleijne | ................... | G06F 21/71 340/652 |
| 7,054,162 B2 * | 5/2006 | Benson | ................... | G06F 21/86 257/678 |
| 7,710,286 B1 * | 5/2010 | Thornley | ............. | G08B 13/128 340/657 |
| 7,898,413 B2 * | 3/2011 | Hsu | ......................... | G06F 21/86 340/568.1 |
| 8,004,419 B2 * | 8/2011 | Thornley | ............. | G08B 13/128 340/657 |
| 8,123,133 B2 * | 2/2012 | Dubois | ................... | G06F 21/87 235/486 |
| 9,147,090 B2 * | 9/2015 | Rahimi | ................... | G06F 21/87 1/1 |
| 2002/0002683 A1 * | 1/2002 | Benson | ................... | G06F 21/86 713/194 |
| 2004/0120101 A1 * | 6/2004 | Cohen | .................... | H01L 23/576 361/654 |
| 2006/0059368 A1 * | 3/2006 | Fayad | ...................... | G06F 21/72 713/189 |
| 2009/0321302 A1 * | 12/2009 | Dubois | ................... | G06F 21/87 206/701 |
| 2010/0182020 A1 * | 7/2010 | Thornley | ............. | G08B 13/128 324/691 |
| 2014/0090093 A1 * | 3/2014 | Rahimi | ................... | G06F 21/86 726/34 |

* cited by examiner

*Primary Examiner* — Paultep Savusdiphol
(74) *Attorney, Agent, or Firm* — Muncy, Geissler, Olds & Lowe, P.C.

(57) ABSTRACT

A card reading device with a plurality of protecting mesh wires includes a main board, an outer frame, a first mesh wire and a second mesh wire. The main board includes an electronic member region and a card inserting case. The outer frame is disposed on the main board and includes a first groove and a second groove. The first groove covers the electronic member region. The second groove covers the card inserting case. The first mesh wire is disposed in the first groove and includes a first wire end connected to the electronic member region. The second mesh wire is disposed in the second groove and includes a second wire and connected to the electronic member region. When the outer frame is damaged or destroyed, the first mesh wire or the second mesh wire is triggered to activate a circuit protecting procedure to shortcut or disconnect a signal circuit.

13 Claims, 13 Drawing Sheets

CARD READING DEVICE WITH A PLURALITY OF PROTECTING MESH WIRES

CROSS-REFERENCES TO RELATED APPLICATIONS

This non-provisional application claims priority under 35 U.S.C. §119(a) on Patent Application No. 103203356 filed in Taiwan, R.O.C. on 2014 Feb. 26, the entire contents of which are hereby incorporated by reference.

BACKGROUND

1. Technical Field

The disclosure relates a card reading device, and particularly to a card reading device with a plural of protecting mesh wires.

2. Related Art

Along with the evolution of information technologies, using a smart card to pay bills, to recognize identification, or to unlock a door via various card reader devices, has become popular in daily life.

So far, the conventional card reader device possesses a multi function password keyboard applicable for credit cards or security cards. By using a credit card, the user can own the product or service before paying the bill; namely, deal-on-credit, allowing the user to buy the product or service rapidly and conveniently. However, along with the increasing penetration rate of the credit card, the security issue of personal credit data has become severe; particularly, credit card embezzling events are frequent due to credit card data being leaked or illegally recorded. Consequently, how to prevent credit card data being stolen (which would cause personal financial loss and perhaps even undermine the financial society of the whole country), has become a public issue urgently in need of a solution.

Typically, components assembled inside a conventional card reading device are protected by protecting members; however, the protecting members cannot protect all the components inside the conventional card reading device sufficiently or enclose various components well, so the possibility of the conventional card reading device being invaded is increased. Additionally, upon assembling the conventional card reading device, screws and other positioning members are applied to lock every components with the device, thus resulting in a prolonged assembling time. Therefore, the aforementioned drawbacks of the conventional card reading device are urgent issues to be solved by the personnel in the skill of art.

SUMMARY

In view of this, a card reading device with a plurality of protecting mesh wires is provided to solve the aforementioned drawbacks, such as time for assembling the card reading device, the inefficient protecting function and issues so forth.

The card reading device with a plurality of protecting mesh wires includes a main board, an outer frame, a first mesh wire and a second mesh wire. The main board includes a first plane and a second plane. The first plane or a portion between the first plane and the second plane includes a plurality of protecting mechanisms. When the card reading device is invaded, the plurality of protecting mechanisms triggers the circuit protecting procedure. The second plane of the main board includes an electronic member region and a card inserting case. The outer frame is disposed on the main board and includes a first groove and a second groove. The first groove covers the electronic member region. The second groove covers the card inserting case. The first mesh wire is disposed in the first groove and includes a first wire end connected to the electronic member region. The second mesh wire is disposed in the second groove and includes a second wire end connected to the electronic member region. The main board, the first mesh wire and the second mesh wire form a stereoscopic protecting structure for protecting the electronic member region in the card reading device from being bridged.

As above, due to the first mesh wire and the second mesh wire enclose the electronic member region and the card inserting case, when the outer frame of the card reading device is invaded or damaged by an external force, the first mesh wire or the second mesh wire will be triggered to activate the circuit protecting procedure to shortcut or disconnect the signal circuit of the card reading device. Additionally, since the first wire end and the second wire end are extended to the indentation of the first mesh wire and are not exposed, the possibility for bridging the first wire end or the second wire end is reduced. Furthermore, assembly of the card reading device is achieved quickly and conveniently by simply connecting the first wire end of the first mesh wire to the first joint, connecting the second wire end of the second mesh wire to the second joint, and connecting the plug member to the connecting socket of the electronic member region of the main board.

The detailed features and advantages of the disclosure are described below in great detail through the following embodiments, the content of the detailed description is sufficient for those skilled in the art to understand the technical content of the disclosure and to implement the disclosure there accordingly. Based on the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
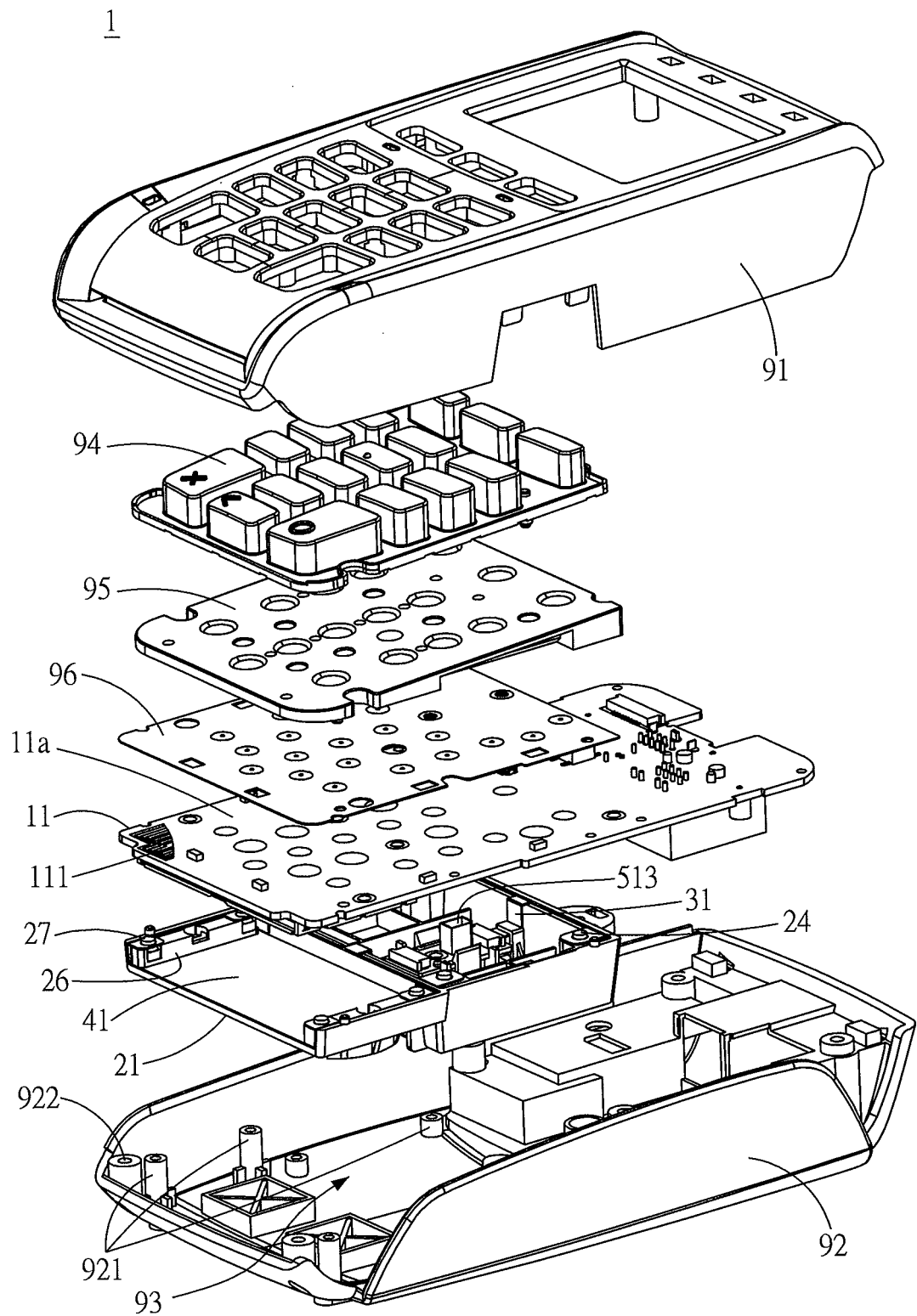
FIG. 1 is an exploded view (1) of a card reading device of one embodiment of the disclosure.
Figure 1A:
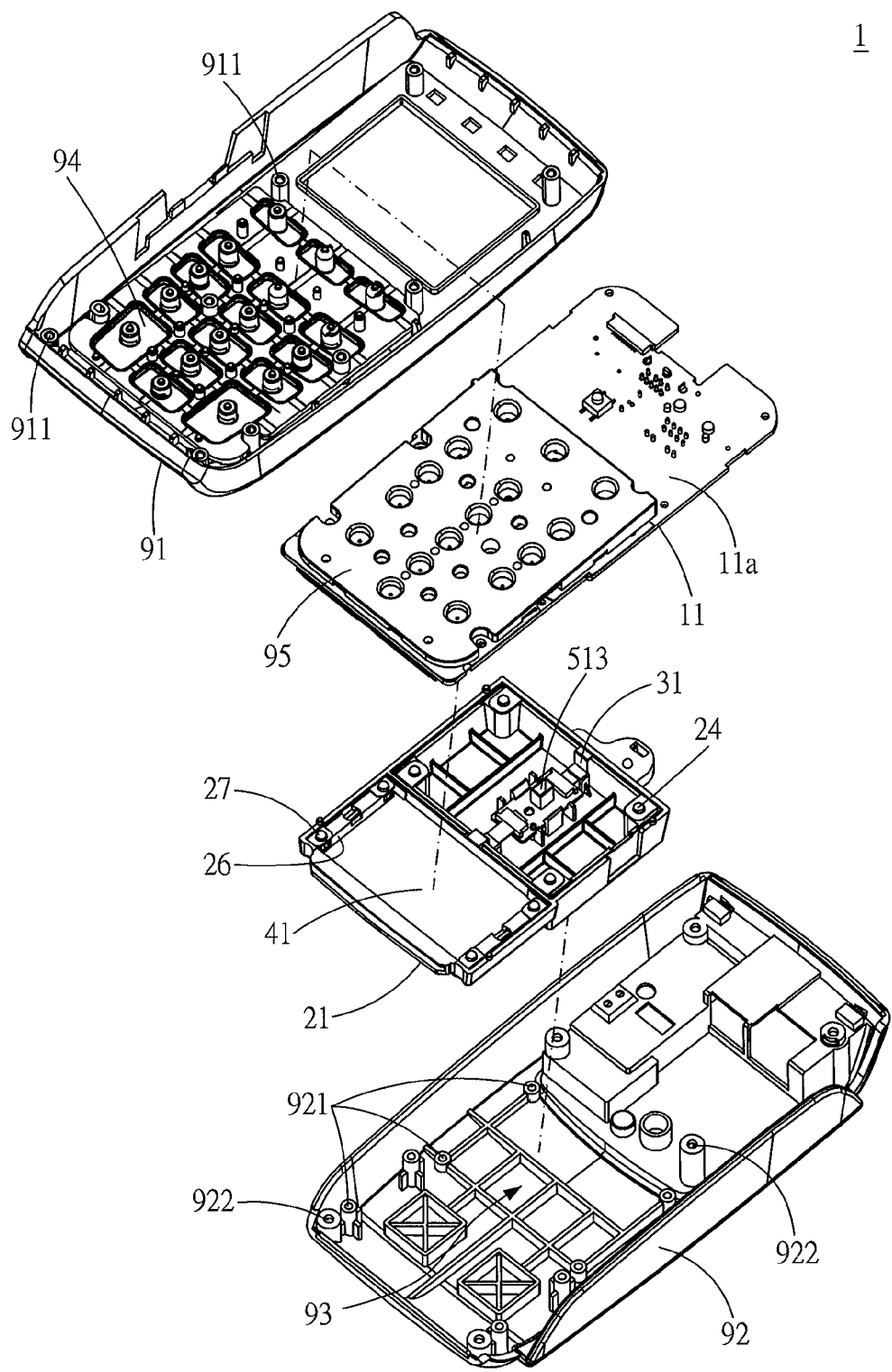
FIG. 1A is an exploded view (2) of the card reading device of the embodiment of the disclosure.
Figure 1B:
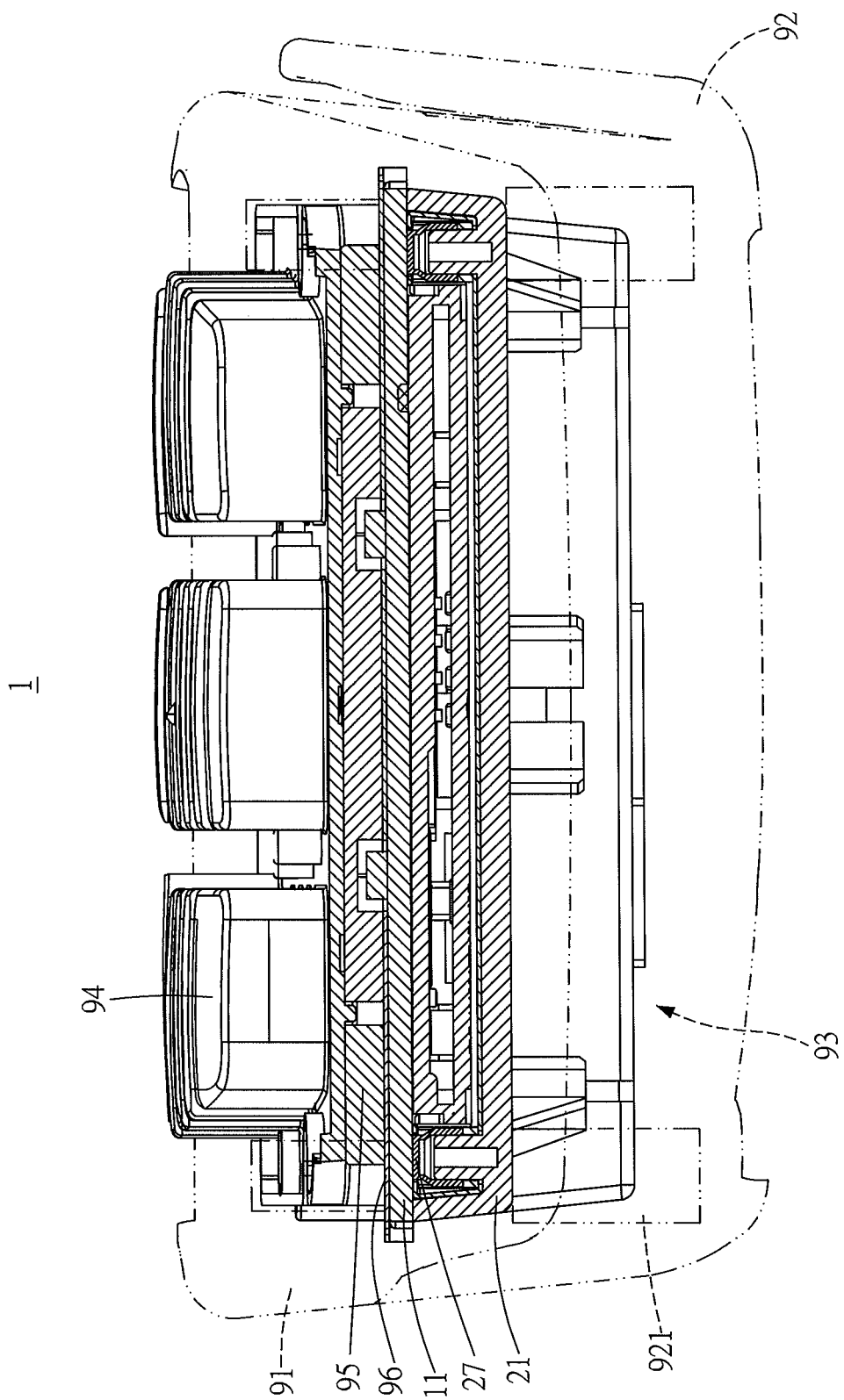
FIG. 1B is a sectional view of the card reading device of the embodiment of the disclosure.

Please refer to FIG. 1, FIG. 1A and FIG. 1B, which are an exploded view (1) of a card reading device 1, an exploded view (2) of the card reading device 1, and a sectional view of the card reading device 1, respectively. The card reading device 1 is provided for performing the functions of card reading, card insertion or deal-on-credit. The card reading device 1 is applicable with a multifunction password keyboard for a credit card, a security card, etc. The multifunction password keyboard further includes a printing device (not shown), provided for printing the receipt for the consumer. The multifunction password keyboard has a function for protecting the information therein, thereby preventing the information from being recorded illegally.

Please refer to FIG. 1, FIG. 1A and FIG. 1B, in which the card reading device 1 includes a top case 91 and a bottom case 92. An inner space 93 of the top case 91 and the bottom case 92 are provided to receive, such as, a keyboard 94, a spacer 95, a mesh sheet 96, a monitor, etc. The card reading device 1 includes a main board 11, an outer frame 21, a first mesh wire 31 and a second mesh wire 41.

Figure 2:
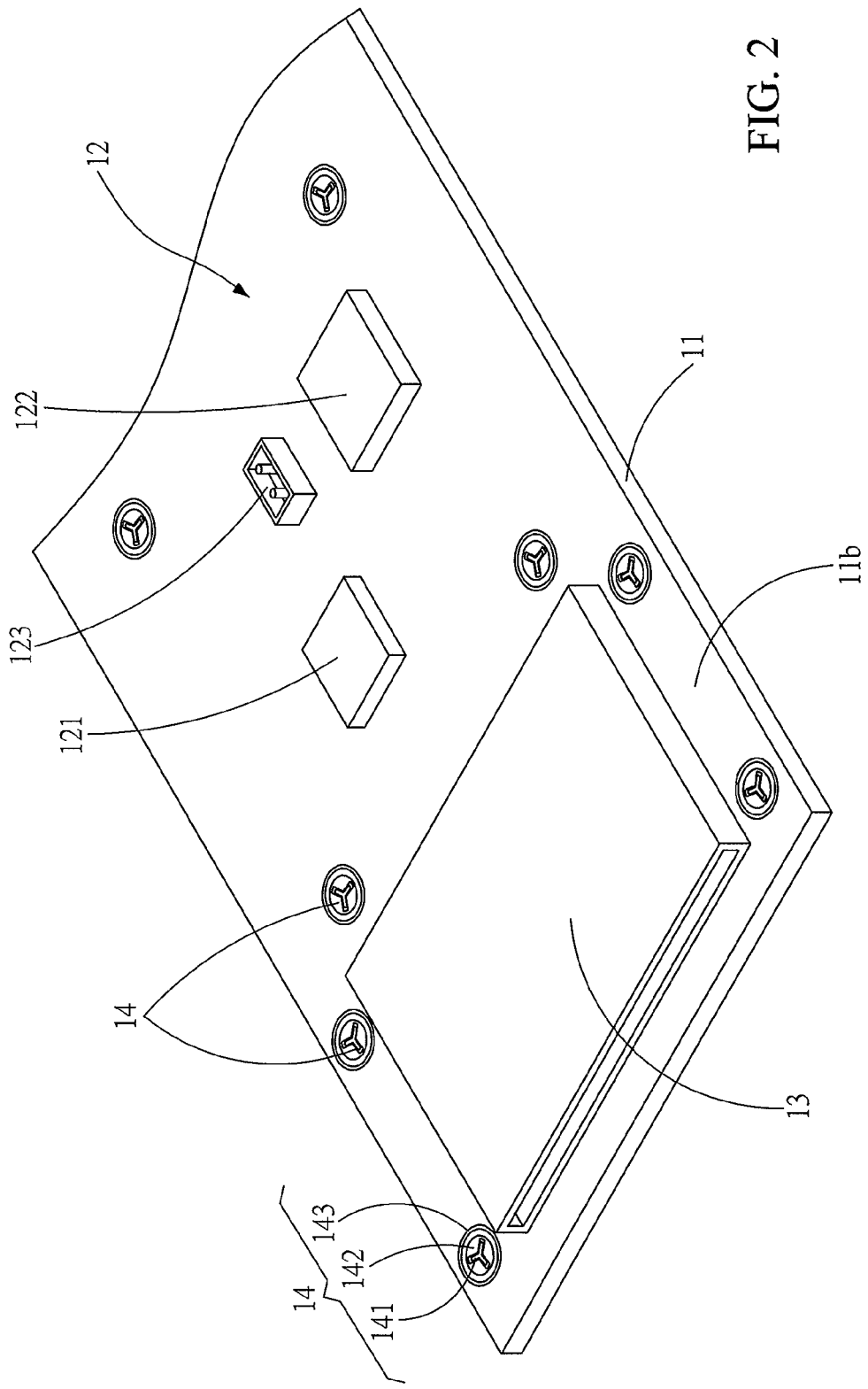
FIG. 2 is a perspective view for showing a second plane of a main board of the carding reading device of the disclosure.
Figure 2A:
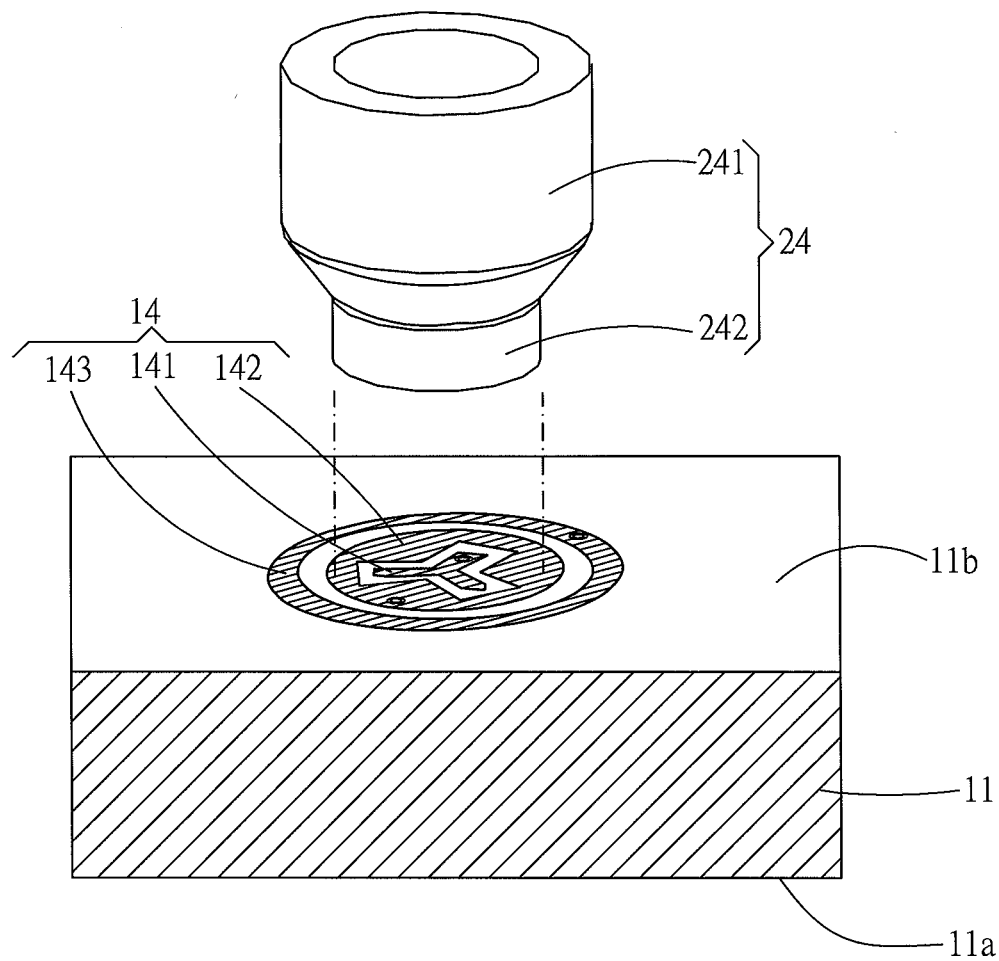
FIG. 2A is a schematic view for showing a first conducting member is assembling to a contact point.
Figure 2B:
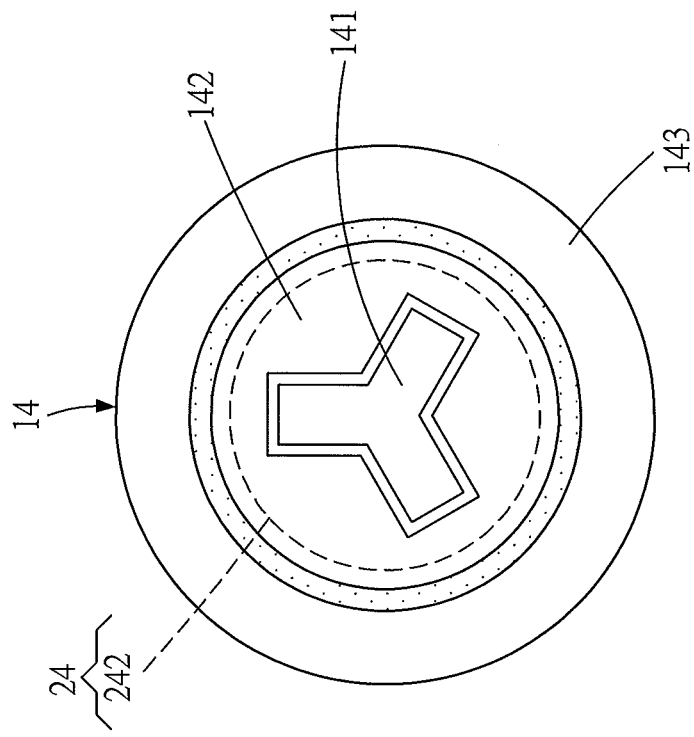
FIG. 2B is an operational view (1) of the contact point of the disclosure.
Figure 2C:
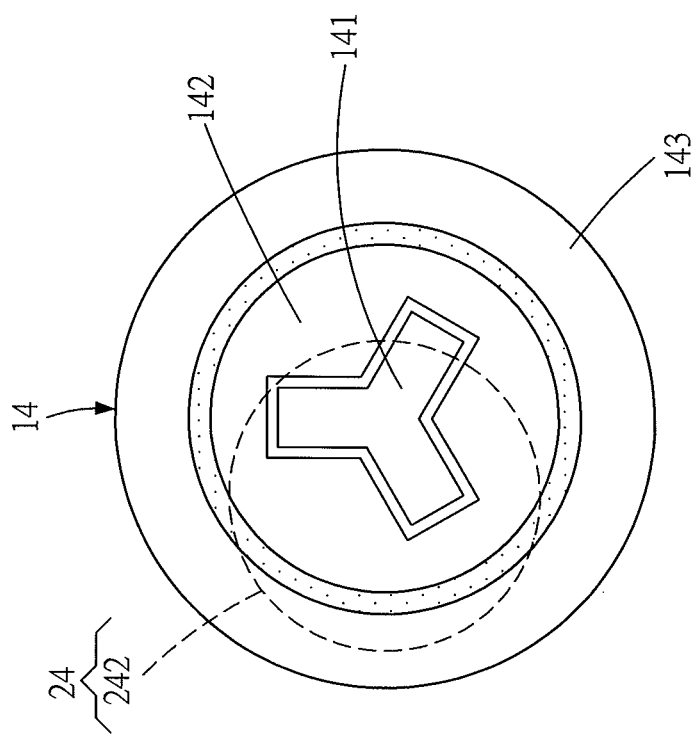
FIG. 2C is an operational view (2) of the contact point of the disclosure.

Please refer to FIG. 1 and FIG. 2, in which the main board 11 is a multilayer circuit board and has a plurality of winding mesh wires 111 distributed thereon. When the plurality of winding mesh wires 111 is invaded, a circuit protecting procedure is activated to shortcut or to disconnect a signal circuit, or to terminate an operation of a microprocessor 121 in the card reading device 1 and to remove the information in a memory 122 of the card reading device 1. The main board 11 includes a first plane 11a (face toward the top case 91), and a second plane 11b (face toward the bottom case 92). Here, the multilayer circuit structure between the first plane 11a and the second plane 11b is designated with a plurality of protecting mechanisms; or, the first plane 11a includes a detecting structure having the plurality of protecting mechanisms, but embodiments are not specified to the feature and details of the protecting mechanisms are omitted.

Please refer to FIG. 2, in which the second plane 11b includes an electronic member region 12, a card inserting case 13 and a plurality of contact points 14. The electronic member region 12 includes a plurality of electronic members, such as the microprocessor 121, the memory 122, a connecting socket 123, a battery, etc.

The plurality of electronic members has the circuit protecting procedure capable of shortcutting or disconnecting the signal circuit, or capable of terminating the operation of the microprocessor 121 of the card reading device 1 and removing the information in the memory 122.

Please refer to FIG. 1, FIG. 2, FIG. 2A, FIG. 2B and FIG. 2C, in which the plurality of contact points 14 is respectively corresponding to a plurality of first conducting members 24 and a plurality of second conducting members 27. Each contact point 14 includes a first sensing point 141, a second sensing point 142 and a third sensing point 143 separated with each other. The first sensing point 141 and the second sensing point 142 respectively forms individual circuits A (positive signal), and B (negative signal), and the third sensing point 143 forms a grounding circuit C (grounding signal). In this embodiment, when the plurality of contact points 14 is bridged with each other by using a conductive material, for example, a conductive liquid, the circuits of the first sensing point 141, the second sensing point 142 and the third sensing point 143 are shortcut, thereby terminating the operation of the microprocessor 121. Additionally, when the plurality of first conducting members 24 and the plurality of second conducting members 27 are respectively connected to the first sensing point 141 and the second sensing point 142, the signal circuit is in a conductive state; otherwise, the operation of the microprocessor 121 is terminated and the information is the memory 122 is removed. In this embodiment, when the third sensing point 143 conducts with the first sensing point 141 or the second sensing point 142, the operation of the microprocessor 121 is terminated and the information in the memory 122 is removed. Upon moving one of the plurality of first conducting members 24 or one of the plurality of second conducting members 27, if at least one of the circuits A and B is disconnected, or if the circuit C is conducted with circuit A or circuit B to be shortcut, the operations of the microprocessor 121 and the card reading device 1 will be terminated, and the information in the memory 122 will be removed.

Figure 3:
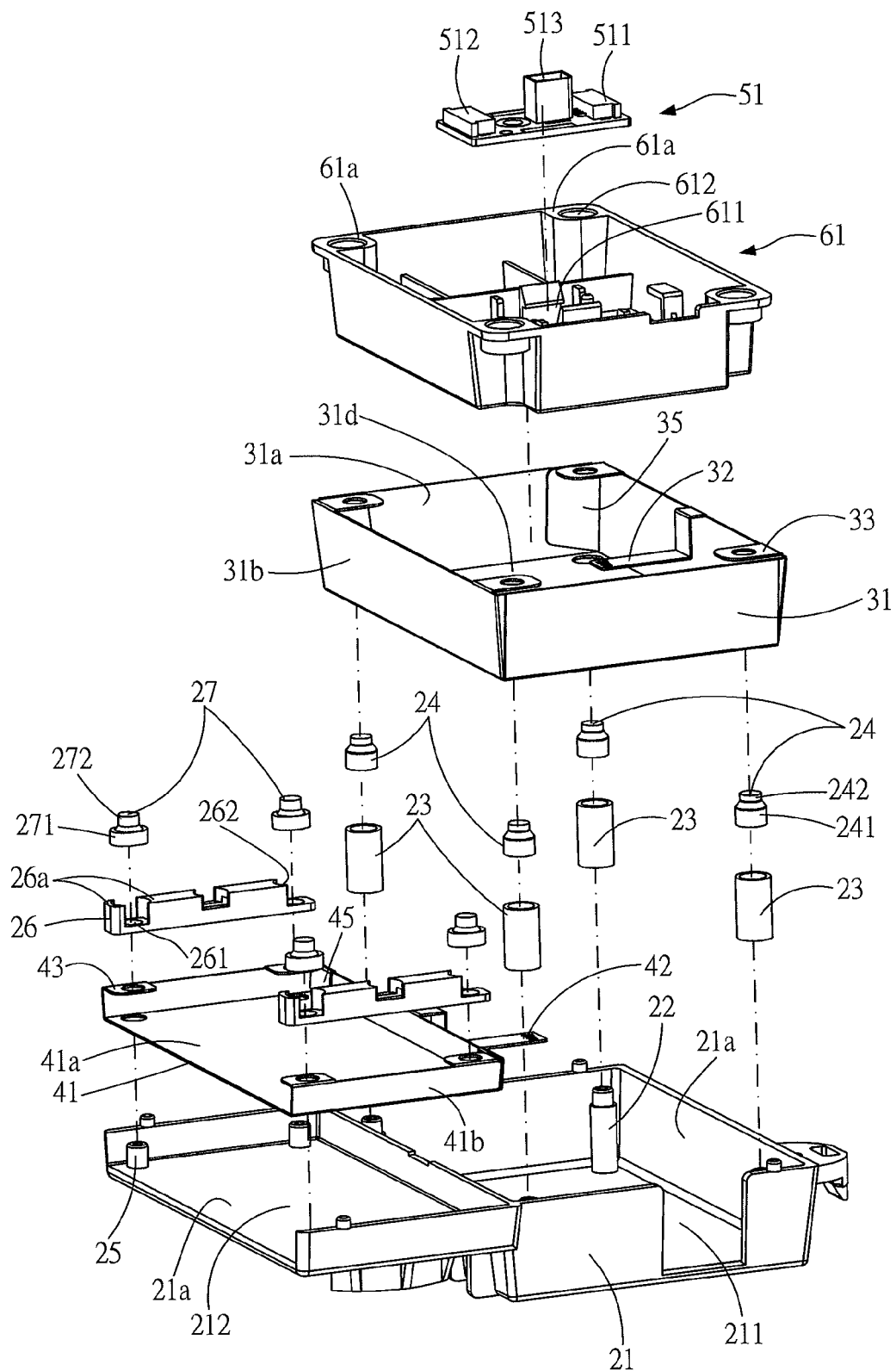
FIG. 3 is a partial exploded view of the embodiment of the card reading device of the disclosure.

Please refer to FIG. 1, FIG. 2 and FIG. 3, in which the outer frame 21 is a box structure with recessed profiles thereon. The outer frame 21 is disposed at the second plane 11n of the main board 11. The bottom case 92 is provided to cover the main board 11 and the outer frame 21. The outer frame 21 includes a first groove 211 and a second groove 212. The first groove 211 is deeper than the second groove 212 and spacing from the second groove 212. The first groove 211 covers the electronic member region 12, and the second groove covers the card inserting case 13.

Please refer to FIG. 3, in which the first groove 211 includes a plurality of first supporting rods 22, a plurality of bushings 23 and the plurality of first conducting members 24. The plurality of first supporting rods 22 and the outer frame 21 are formed integrally as whole and the plurality of first supporting rods 22 is extended longitudinally from the outer frame 21. The plurality of first supporting rods 22 passes through the first mesh wire 31. The plurality of bushings 23 is made of metal. Here, the plurality of bushings 23 is made of steel, but embodiments are not limited thereto. The application of the plurality of bushings 23 reduces the possibility for being damaged and bridged. The plurality of bushings 23 is sleeved with the plurality of first supporting rods 22, respectively.

Please refer to FIG. 3, in which the plurality of first conducting members 24 is conductive rubbers with circular outlines; in some implementation aspects, the first conducting member 24 is a conductive tape. Each of the plurality of first conducting members 24 includes a first main body 241 and a first conducting terminal 242. The length of the top face of the first main body 241 is equal to the width of the top face of the first main body 241, so that the first main body 241 is formed as a circular cylinder, the size of the first conducting terminal 242 is smaller than that of the first main body 241, and the first conducting terminal 242 is connected to the top portion of the first main body 241. Here, the first main body 241 and the first conducting terminal 242 are circular cylinders, but embodiments are not limited thereto; in some implementation aspects, the first main body 241 and the first conducting terminal 242 are rectangular cylinders. The plurality of first main bodies 241 is respectively combined with the plurality of first supporting rods 22.

Figure 6:
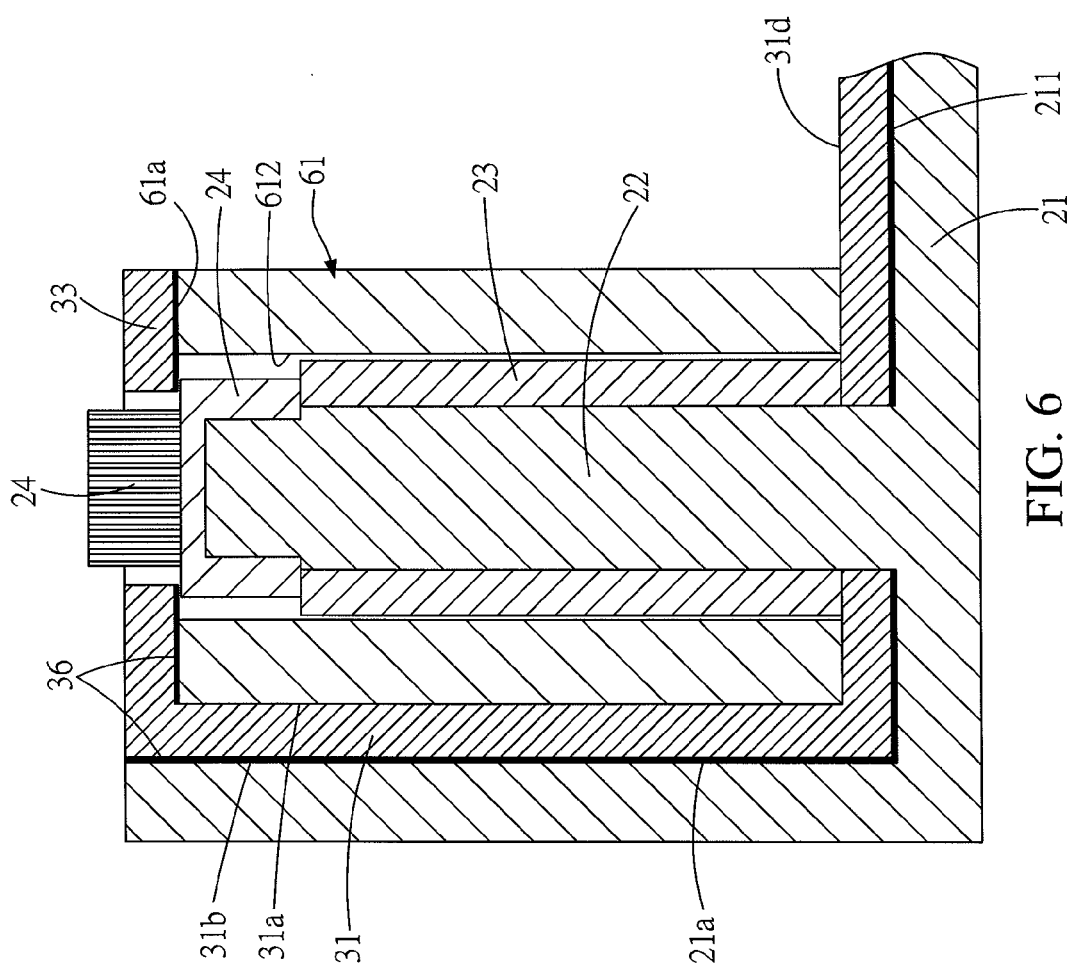
FIG. 6 is a partial lateral view of an assembled first groove.

Please refer to FIG. 3 and FIG. 6, in which the plurality of first conducting members 24 is respectively disposed at the top portions of the plurality of first supporting rods 22 and respectively sleeved with a plurality of first bent structures 33. The plurality of first conducting members 24 is respectively provided to connect to the plurality of contact points 14 of the electronic member region 12.

Figure 7:
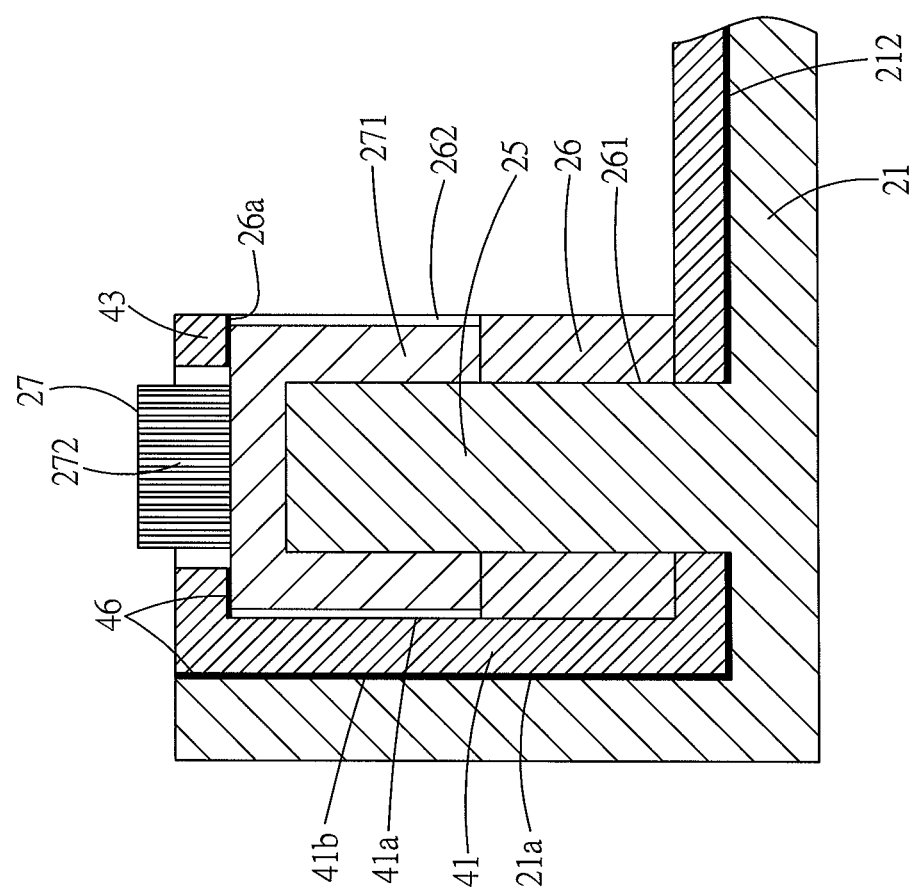
FIG. 7 is a partial lateral view of an assembled second groove.

Please refer to FIG. 3 and FIG. 7, in which the outer frame 21 further includes a plurality of security blocks 26 disposed thereon and formed as elongated holder structures. Each of the plurality of security blocks 26 includes a plurality of through holes 261 and a plurality of troughs 262 respectively communicating with the plurality of through holes 261. The plurality of through holes 261 corresponds to a plurality of second supporting rods 25 for inserting the plurality of second supporting rods 25. The plurality of troughs 262 corresponds to the plurality of second conducting members 27 for inserting the plurality of second supporting rods 25. The plurality of security blocks 26 is disposed in the second groove 212 and attached to the inner plane 41a of the second mesh wire 41. The plurality of security blocks 26 is provided to be abutted against two sides of the card inserting case 13, as shown in FIG. 2.

Please refer to FIG. 3 and FIG. 7, in which the second groove 212 includes the plurality of second supporting rods 25 and the plurality of second conducting members 27. The plurality of second supporting rods 25 and the outer frame 21 are formed integrally as whole and the plurality of second supporting rods 25 is extended longitudinally from the outer frame 21. The plurality of second supporting rods 25 passes through the second mesh wire 32 and is inserted into the plurality of through holes 261 of the plurality of security blocks 26.

Please refer to FIG. 3 and FIG. 7, in which the plurality of second conducting members 27 is conductive rubbers with circular outlines; in some implementation aspects, the second conducting member 27 is a conductive tape. The second conducting member 27 includes a second main body 271 and a second conducting terminal 272. The length of the top face of the second main body 271 is larger than the width of the top face of the second main body 271, so that the second main body 271 is approximately formed as an elliptical cylinder, the size of the second conducting terminal 272 is smaller than that of the second main body 271, and the second conducting terminal 272 is connected to the top portion of the second main body 271. Here, the second main body 271 and the second conducting terminal 272 are respectively an elliptical cylinder and an circular cylinder, but embodiments are not limited thereto; in some implementation aspects, the second main body 271 is a circular cylinder or a rectangular cylinder, and the second conducting terminal 272 is a rectangular cylinder. The second main body 271 is received in the plurality of troughs 262 of the plurality of security blocks 26. Due to the small volumes of the second main body 271 and the security block 26, the card inserting case 13 can be assembled properly.

Please refer to FIG. 7, in which the plurality of second conducting members 27 is respectively disposed at the top portions of the plurality of second supporting rods 25 and respectively sleeved with a plurality of second bent structures 43. The plurality of second conducting members 27 is respectively provided to connect to the plurality of contact points 14 of the electronic member region 12.

Please refer to FIG. 3 and FIG. 6, in which the outer frame 21 further includes an inner frame 61 assembled therein. The inner frame 61 is a box structure with recessed profiles. The inner frame 61 is disposed in the first groove 211 and attached with an inner plane 31a of the first mesh wire 31.

Please refer to FIG. 3, in which the inner frame 61 further includes an adapting board 51 disposed in the first groove 211. The adapting board 51 includes a first joint 511, a second joint 512 and a plug member 513. The first joint 511 is connected to a first wire end 32 of the first mesh wire 31, the second joint 512 is connected to a second wire end 42 of the second mesh wire 41, and the plug member 513 is provided to connect with the connecting socket 123 of the electronic member region 12, as shown in FIG. 2.

Please refer to FIG. 3 and FIG. 6, in which the inner frame 61 includes an engaging structure 611 and a plurality of via holes 612. The engaging structure 611 and the inner frame 61 are formed integrally as a whole. The engaging structure 61 is disposed at an inner side of the inner frame 61 to fasten with the adapting board 51. The plurality of via holes 612 is disposed at the periphery of the inner frame 61. The inner frame 61 further includes a plurality of connecting planes 61a respectively disposed around peripheries of the plurality of via holes 612.

Figure 4:
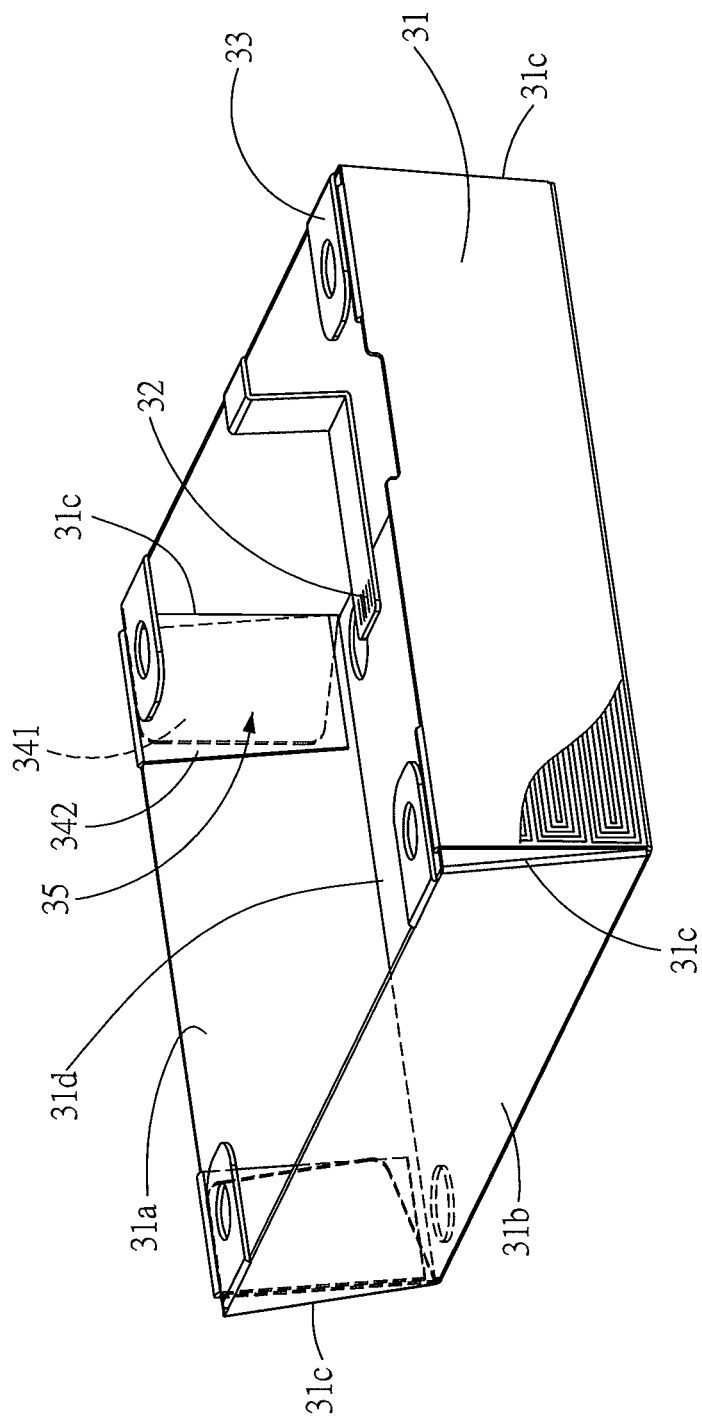
FIG. 4 is a perspective view of a first mesh wire of the embodiment of the disclosure.
Figure 4A:
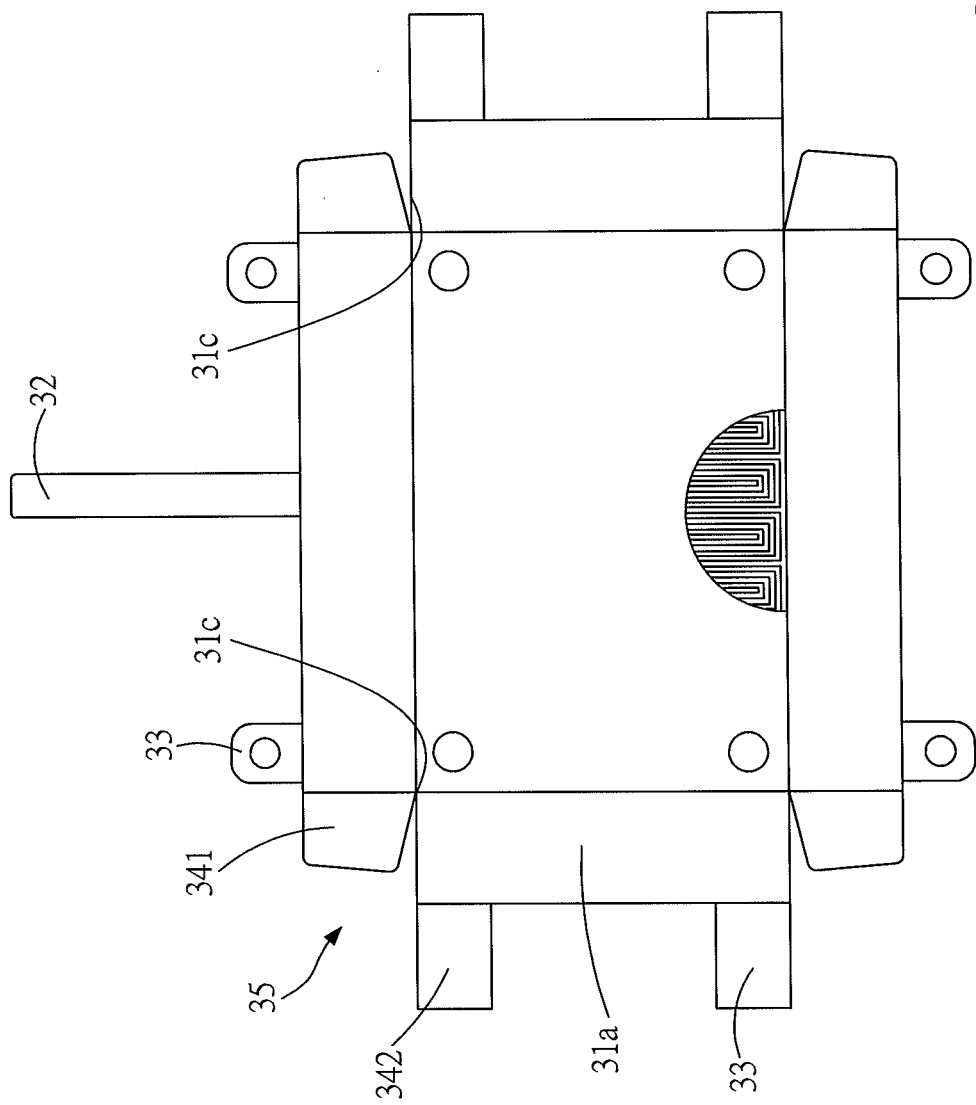
FIG. 4A is a plan developed view of the first mesh wire of the embodiment of the disclosure.

Please refer to FIG. 3, FIG. 4 and FIG. 4A, in which the first mesh wire 31 is a flexible circuit board with a plurality of winding circuits distributed thereon and act as a security circuit. The first mesh wire 31 is bent to form a box structure with recessed profiles. The first mesh wire 31 is disposed in the first groove 211 and matched with the first groove 211 in depth and width. The first mesh wire 31 has an indentation 31d recessed therein, and the first wire end 32 of the first mesh wire 31 and the second wire end 42 of the second mesh wire 41 are extended to the indentation 31d so as to prevent the first wire end 32 and the second wire end 42 from being exposed thus to be invaded.

Please refer to FIG. 3, FIG. 4 and FIG. 4A, in which the first mesh wire 31 has the first wire end 32 connected to the first joint 511. In some implementation aspects, the first wire end 32 is directly connected to the electronic member region 12; that is, the first wire end 32 is directly connected to the electronic member region 12 without the adapting board 51.

Please refer to FIG. 3, FIG. 4 and FIG. 4A, in which the first mesh wire 31 has the plurality of first bent structures 33 protruded thereon and disposed at the edges of an opening of the first mesh wire 31. The plurality of first bent structures 33 is bent toward an interior of the first mesh wire 31 and attached with a plane of the inner frame 61; namely, the connecting plane 61a. When an external force is applied to the card reading device 1 to contact with the first bent structure 33, the circuit within the first bent structure 33 is shortcut or disconnected, or the first conducting member 24 corresponding to the contacted first bent structure 33 is disconnected with the contact point 14 of the main board 11 or contacts with the third sensing point 143 to be shortcut, thereby triggering the circuit protecting procedure within the electronic members of the electronic member region 12 to shortcut or disconnect the signal circuit.

Please refer to FIG. 4 and FIG. 4A, in which the first mesh wire 31 further includes a plurality of first overlapped regions 35 disposed at corners 31c of the first mesh wire 31, but embodiments are not limited thereto. Here, a plurality of first bent edges 341 and a plurality of second bent edges 342 are respectively disposed at the corners 31c of the first mesh wire 31, so that when the first mesh wire 31 is bent to form the box structure, the plurality of second bent edges 342 respectively stacks with the plurality of first bent edges 341 to form the first overlapped regions 35 having improved protection.

Please refer to FIG. 6, in which the first mesh wire 31 further has a first adhering material 36 disposed at an outer plane 31b of the first mesh wire 31 and attached with an inner plane 21a of the outer frame 21. With the first adhering material 36, the first mesh wire 31 is securely attached with the inner plane 21a of the first groove 211 of the outer frame 21, so that when the external force damages the outer frame 21, the external force also damages the first mesh wire 31 leading to the circuit in the first mesh wire 31 being disconnected or shortcut.

Figure 5:
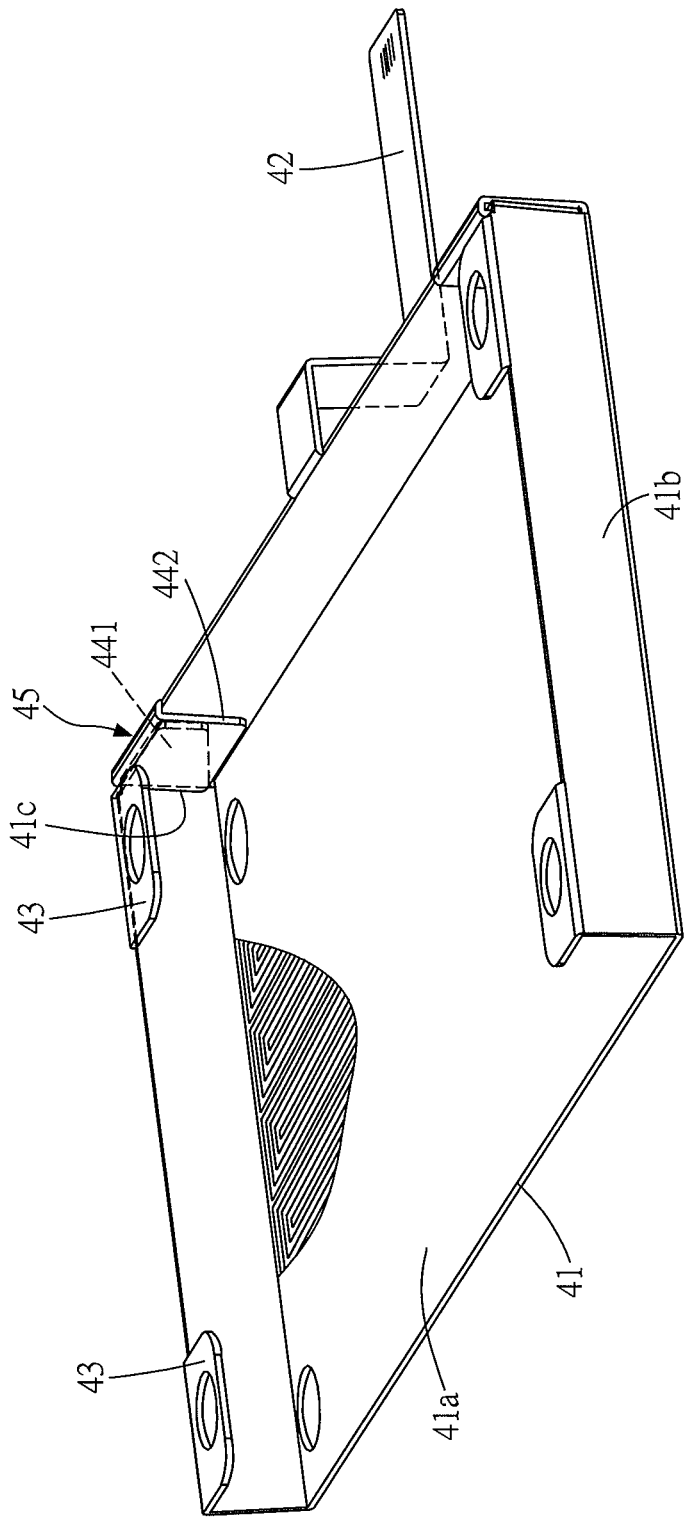
FIG. 5 is a perspective view of a second mesh wire of the embodiment of the disclosure.
Figure 5A:
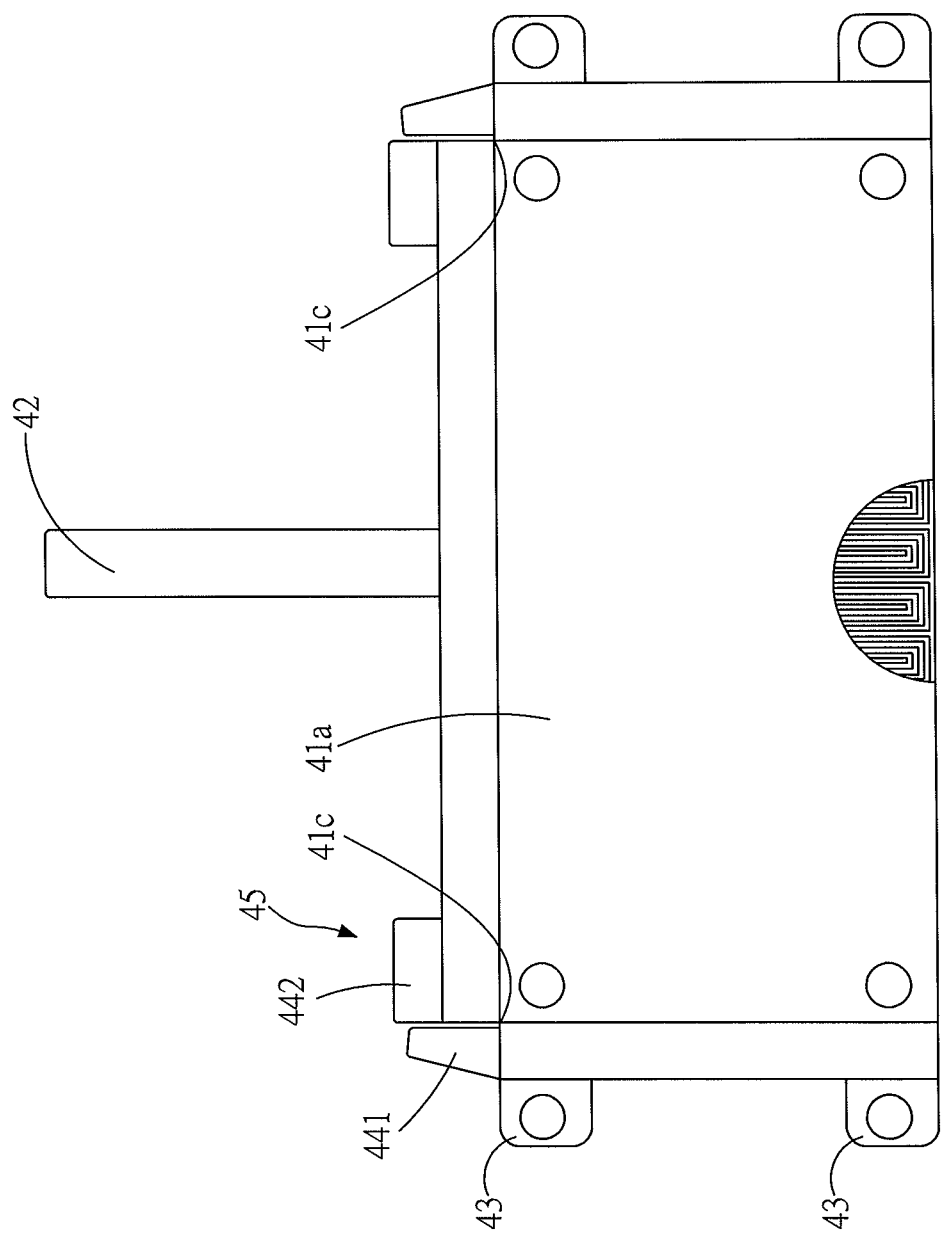
FIG. 5A is a plan developed view of the second mesh wire of the embodiment of the disclosure.

Please refer to FIG. 3, FIG. 5 and FIG. 5A, in which the second mesh wire 41 is a flexible circuit board with a plurality of winding wires distributed thereon and act as a security circuit. The second mesh wire 41 is bent to form a box structure with recessed profiles, and an opening is formed at the lateral side of the second mesh wire 41 and corresponds to a card inserting groove of the card inserting case 13. The second mesh wire 41 is disposed in the second groove 212 and matched with the second groove 212 in depth and width.

Please refer to FIG. 3, FIG. 5 and FIG. 5A, in which the second mesh wire 41 has the second wire end 42 connected to the second joint 512. In some implementation aspects, the second wire end 42 is directly connected to the electronic member region 12; that is, the second wire end 42 is directly connected to the electronic member region 12 without the adapting board 51.

Please refer to FIG. 3, FIG. 5 and FIG. 5A, in which the second mesh wire 41 has the plurality of second bent structures 43 protruded thereon and disposed at the edges of an opening of the second mesh wire. The plurality of second bent structures 43 is bent toward an interior of the second mesh wire 42 and attached with a plane of the security block 26; namely, the connecting plane 26a. When the external force is applied to the card reading device 1 to contact with the second bent structure 43, the circuit within the second bent structure 43 is shortcut or disconnected, or the second conducting member 47 corresponding to the contacted second bent structure 43 is disconnected with the contact point 14 of the main board 11 or contacts with the third sensing point 143 to be shortcut, thereby triggering the circuit protecting procedure within the electronic members of the electronic member region 12 to shortcut or disconnect the signal circuit.

Please refer to FIG. 5 and FIG. 5A, in which the second mesh wire 41 further includes a plurality of second overlapped regions 45 disposed at corners 41c of the second mesh wire 41, but embodiments are not limited thereto. Here, a plurality of first folded edges 441 and a plurality of second folded edges 442 are respectively disposed at the corners 41c of the second mesh wire 41, so that when the second mesh wire 41 is bent to form the box structure, the plurality of second folded edges 442 respectively stacks with the plurality of first folded edges 441 to form the second overlapped regions 45 having improved protection.

Please refer to FIG. 7, in which the second mesh wire 41 further has a second adhering material 46 disposed at an outer plane 41b of the second mesh wire 41 and attached with the inner plane 21a of the outer frame 21. With the second adhering material 46, the second mesh wire 41 is securely attached with the inner plane 21a of the second groove 212 of the outer frame 21, so that when the external force damages the outer frame 21, the external force also damages the second mesh wire 41 leading to the circuit in the second mesh wire 41 being disconnected or shortcut.

Please refer to FIG. 2 and FIG. 3, in which upon assembly, the first wire end 32 of the first mesh wire 31 is connected to the first joint 511, the second wire end 42 of the second mesh wire 41 is connected to the second joint 512, and the plug member 513 is connected to the connecting socket 123 of the electronic member region 12 of the main board 11. Therefore, the assembling of the card reading device 1 is convenient.

When the outer frame 21 is invaded or when the card reading device 1 is damaged, for example, from the bottom case 92 or from the card inserting groove of the card inserting case 13, the outer frame 21 is damaged so as to trigger the first mesh wire 31 or the second mesh wire 41 to activate the circuit protecting procedure within the electronic members of the electronic member region 12, thereby disconnecting or shortcutting the signal circuit.

Please refer to FIG. 1A and FIG. 1B, in which the inner side of the top case 91 has the keyboard 94, the spacer 95 and the mesh sheet 96 sequentially stacked with each other and abutted against the main board 11. The inner side of the bottom case 92 has an abutting member 921, such as a circular cylinder, a protruding block, etc., disposed thereon to abuttingly attach with the outer frame 21. When the card reading device 1 is at an assembling state, the top case 91 and the bottom case 92 undergo pre-press strokes; here, when the top case 91 is combined with the bottom case 92, the keyboard 94, the spacer 95, and the mesh sheet 96 are pressed by the top case 91 to move downward and results a downward stroke; while the abutting member 921 of the bottom case 92 is pressed to move upward and results an upward stroke. That is, the components received in the inner space 93 between the top case 91 and the bottom case 92 are elastically compressed and pressed to connect with the plurality of contact points 14 via the elastic property of the plurality of first conducting members 24 and the plurality of second conducting members 27.

When the card reading device 1 is disassembled, the pre-press strokes of the top case 91 and the bottom case 92 are disappeared and the plurality of first conducting members 24 and the plurality of second conducting members 27 are moved, so that the plurality of first conducting members 24 and the plurality of second conducting members 27 are no longer connect with the plurality of contact points 14, thereby triggering the circuit protecting procedure.

Please refer to FIG. 1A, in which the top case 91 has a plurality of first positioning structures 911 matching with a plurality of second positioning structures 922 assembled on the bottom case 92, respectively. Here, the plurality of first positioning structures 911 and the plurality of second positioning structures 922 are, for example, thread structures, buckle structures, etc. Here, the plurality of first positioning structures 911 is locked with the plurality of second positioning structures 922 via screw members, so that the top case 91 and the bottom case 92 are locked and positioned with each other, thereby making the top case 91 and the bottom case 92 abut against the components in the inner space 93 and undergo the pre-press strokes.

As above, in the disclosure, the main board 11, the first mesh wire 31 and the second mesh wire 41 form a stereoscopic protecting structure for protecting the electronic member region 12 in the card reading device 1 from being bridged. Due to the first mesh wire 31 and the second mesh wire 32 enclose the electronic member region 12 and the card inserting case 13 as protecting structures, when the outer frame 21 of the card reading device 1 is invaded or damaged by an external force, the first mesh wire 31 or the second mesh wire 41 will be triggered to activate the circuit protecting procedure to shortcut or disconnect the signal circuit of the card reading device 1. Additionally, since the first wire end 32 and the second wire end 42 are extended to the indentation 31d of the first mesh wire 31 and are not exposed, the possibility for bridging the first wire end 31 or the second wire end 41 is reduced. Additionally, the assembling of the card reading device 1 is convenient and quickly by connecting the first wire end 32 of the first mesh wire 31 to the first joint 511, connecting the second wire end 42 of the second mesh wire 41 to the second joint 512, and connecting the plug member 513 to the connecting socket 123 of the electronic member region 12 of the main board 11.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A card reading device with a plurality of protecting mesh wires, comprising:
   a main board, having a plurality of winding mesh wires distributed thereon, the main board comprising a first plane and a second plane, the second plane comprising an electronic member region and a card inserting case;
   an outer frame, disposed on the main board, comprising:
      a first groove, covering the electronic member region;
      a second groove, covering the card inserting case;
      an inner frame, disposed in the first groove;
      a plurality of security blocks, disposed in the second groove;
      a plurality of first conducting members, disposed in the first groove and connected to the electronic member region; and
      a plurality of second conducting members, disposed in the second groove and connected to the electronic member region;
   a first mesh wire, disposed in the first groove, comprising:
      a first wire end, connected to the electronic member region;
      a plurality of first bent structures, attaching to a surface of the inner frame and passing through the plurality of first conducting members; and
      a plurality of second bent structures, attaching to one surfaces of the plurality of security blocks and passing through the plurality of second conducting members; and
   a second mesh wire, disposed in the second groove, the second mesh wire comprising a second wire end connected to the electronic member region, wherein when the outer frame is damaged or destroyed by an external force so as to contact with the main board, the first mesh wire or the second mesh wire, a circuit protecting procedure is triggered to shortcut or disconnect a signal circuit.

2. The card reading device with a plurality of protecting mesh wires according to claim 1, wherein the inner frame further comprises an adapting board, disposed in the first groove, the electronic member region comprises a connecting socket, the adapting board comprises a first joint, a second joint and a plug member, the first joint is connected to the first wire end of the first mesh wire, the second joint is connected to the second wire end of the second mesh wire, and the plug member is connected to the connecting socket.

3. The card reading device with a plurality of protecting mesh wires according to claim 1, wherein the inner frame of the outer frame is attached with an inner plane of the first mesh wire, so that the first mesh wire is attached with the first groove securely.

4. The card reading device with a plurality of protecting mesh wires according to claim 1, wherein the plurality of security blocks of the outer frame is attached with an inner plane of the second mesh wire, so that the second mesh wire is attached with the second groove securely, and the plurality of security blocks is abutted against two sides of the card inserting case.

5. The card reading device with a plurality of protecting mesh wires according to claim 1, wherein the outer frame further comprises:
   a plurality of first supporting rods, disposed in the first groove and passing through the first mesh wire; and
   a plurality of bushings, disposed in the first groove and sleeving with the plurality of first supporting rods;
   wherein, the plurality of first conducting members is respectively disposed at the plurality of first supporting rods.

6. The card reading device with a plurality of protecting mesh wires according to claim 1, wherein the outer frame further comprises a plurality of second supporting rods, disposed in the second groove and passing through the second mesh wire, the plurality of second conducting members is respectively disposed at the plurality of second supporting rods.

7. The card reading device with a plurality of protecting mesh wires according to claim 1, wherein the first mesh wire and the second mesh wire comprises a plurality of overlapped regions, disposed at corners of the first mesh wire and corners of the second mesh wire.

8. The card reading device with a plurality of protecting mesh wires according to claim 1, wherein the first mesh wire comprises an indentation, the first wire end and the second wire end are extended to the indentation.

9. The card reading device with a plurality of protecting mesh wires according to claim 1, wherein the first mesh wire and the second mesh wire comprises an adhering material, disposed at an outer plane of the first mesh wire and an outer plane of the second mesh wire, and adhered to an inner plane of the outer frame.

10. The card reading device with a plurality of protecting mesh wires according to claim 1, wherein the main board further comprises a plurality of contact points corresponding to the plurality of first conducting members and the plurality of second conducting members, the plurality of contact points comprises a first sensing point, a second sensing point and a third sensing point separated with each other, wherein when the plurality of first conducting members and the plurality of second conducting members are respectively connected to the first sensing point and the second sensing point, the signal circuit is in a conductive state; otherwise, an operation of a microprocessor is terminated and the information in a memory is removed.

11. The card reading device with a plurality of protecting mesh wires according to claim 10, wherein when the third sensing point conducts with the first sensing point or the second sensing point, the operation of the microprocessor is terminated and the information in the memory is removed.

12. The card reading device with a plurality of protecting mesh wires according to claim 10, further comprising a top case and a bottom case combined with each other, the top case and the bottom case undergo a pre-press stroke, so that the plurality of first conducting members and the plurality of second conducting members are pressed to connect with the plurality of contact points.

13. The card reading device with a plurality of protecting mesh wires according to claim 1, wherein the first plane of the main board or a portion between the first plane and the second plane comprises a plurality of protecting mechanisms, wherein when the card reading device is invaded, the plurality of protecting mechanisms triggers the circuit protecting procedure.

* * * * *